April 29, 1930. A. E. REID 1,756,211
PISTON AND CONNECTING ROD
Filed Dec. 19, 1928    2 Sheets-Sheet 1
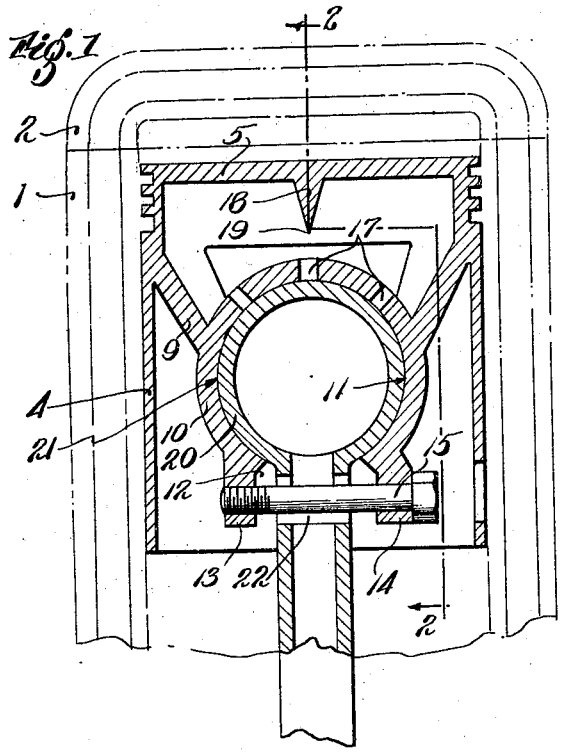
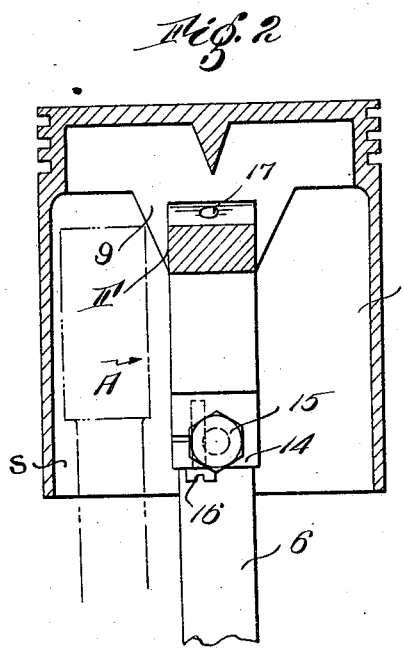
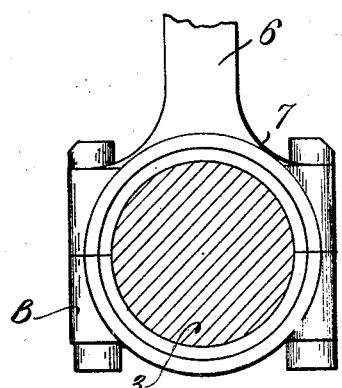
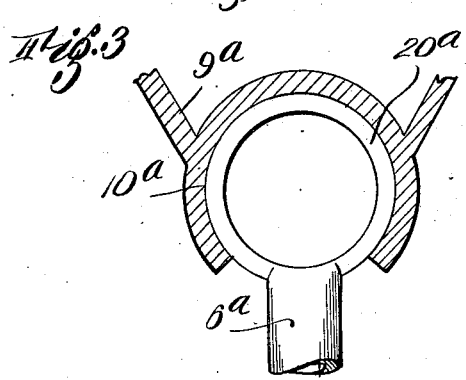
Inventor
Allan E. Reid,
by Roberts Cushman Woodberry
his Attorneys.

April 29, 1930.    A. E. REID    1,756,211
PISTON AND CONNECTING ROD
Filed Dec. 19, 1928    2 Sheets-Sheet 2
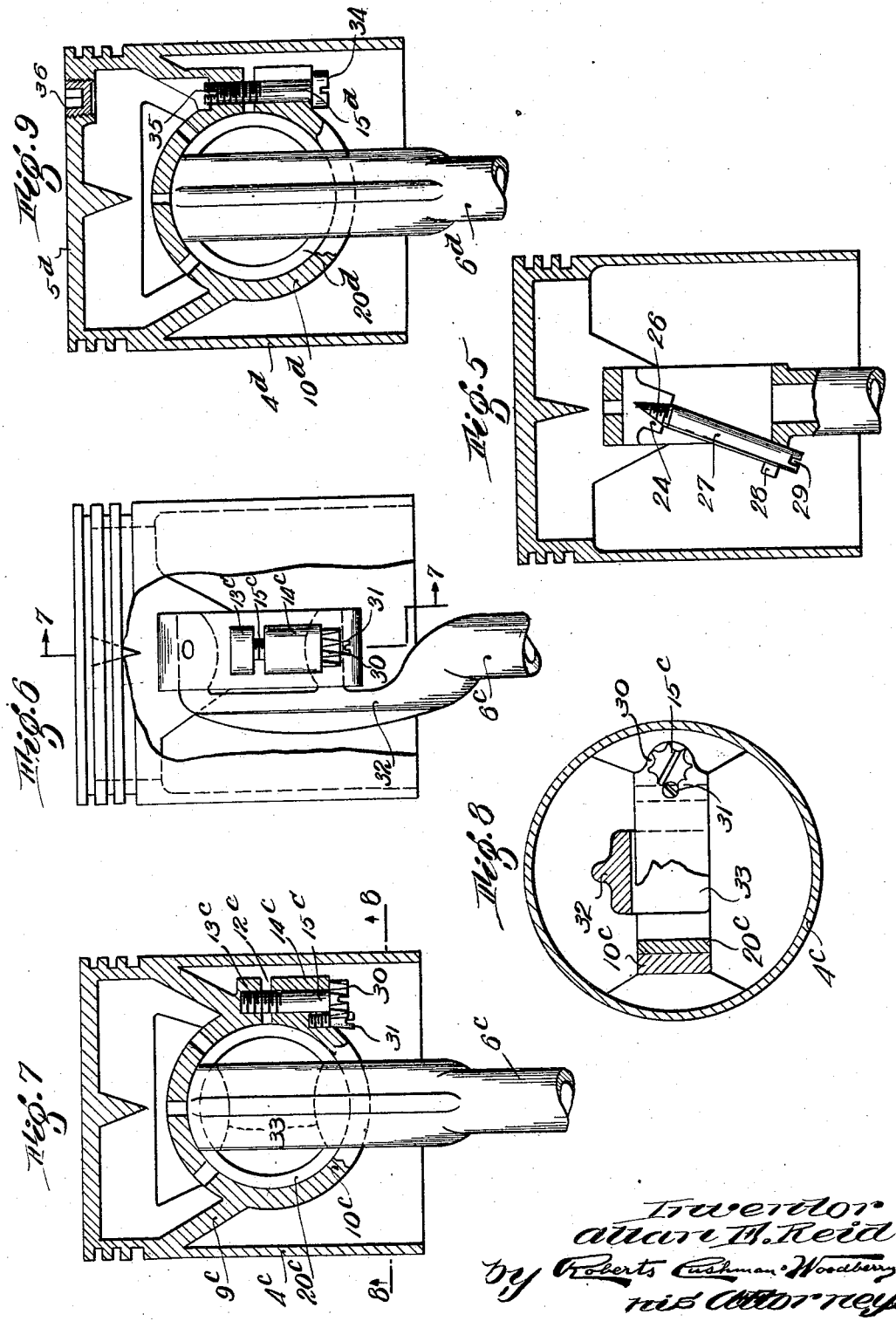

Patented Apr. 29, 1930

1,756,211

UNITED STATES PATENT OFFICE

ALLAN E. REID, OF BOSTON, MASSACHUSETTS, ASSIGNOR TO REID PISTON COMPANY, OF BROOKLINE, MASSACHUSETTS, A CORPORATION OF MASSACHUSETTS

PISTON AND CONNECTING ROD

Application filed December 19, 1928. Serial No. 327,006.

This invention pertains to pistons and connecting rods of that general type in which the connecting rod transmits motion directly from the piston to the crank shaft without the interposition of a piston rod and cross head. In such arrangements, the piston usually has a depending skirt or hollow body portion designed to prevent tipping or slap of the piston as it reciprocates, and the end of the connecting rod is united to the piston by means of a wrist pin engaging the skirt of the piston at diametrically opposite points, and to receive the wrist pin, the piston must be provided with accurately aligned bearing openings. To avoid undue weight, as well as to lessen the cost of production, the wrist pin is usually of relatively small diameter, for example, three-quarters of an inch, and the journal opening in the connecting rod for the reception of the pin is of corresponding diameter. The bearing surfaces between the pin and rod, as well as between the pin and piston, are thus of limited extent so that the pressure between the contacting surfaces is often very high with consequent rapid wear, and to lengthen the life of the parts as much as possible the journal openings are usually bushed with a suitable bearing metal.

When employed in internal combustion engines, pistons and connecting rods of this type are driven at very high speed, often without adequate lubrication, and for long periods without rest, and in consequence it is common to find that replacement of the wrist pin (usually requiring re-boring of the journal openings in the piston and connecting rod) is necessary after a comparatively short period of use of the engine. Replacement of the wrist pin when wear becomes excessive, necessitates removal of the piston from the cylinder (a troublesome and expensive operation which involves removal of the engine head, draining of the crank case, and disconnecting the connecting rod from the crank shaft) so that such repair work is often deferred long after its desirability has become manifest, with consequent loss in efficiency and possibly permanent damage to the engine.

In accordance with my present invention, I provide a construction which is simpler and whose first cost is less than the usual arrangements above described. Thus I employ a single journal opening to take the place of the three openings usually required, although at the same time I provide bearing surfaces of greatly increased area so that the pressure and wear is reduced and the bushings may be dispensed with; the connecting rod may be disconnected from the piston and again attached thereto without removing the piston from the cylinder or taking off the engine head; in the preferred constructions, such slight wear as may result from long continued operation of the parts may be taken up without disconnecting the piston and connecting rod from each other or removing them from their normal working positions; while a permanent and preferably integral part of the connecting rod itself constitutes a pivot member which oscillates in the journal opening in the piston, thus wholly dispensing with the usual independent wrist pin. Thus the number of parts required is reduced to a minimum and the cost of manufacturing is lessened. Incidentally I may provide for improved lubrication of the engaging surfaces of the piston and connecting rod, and in accordance with one possible embodiment of the invention, wear may be taken up by adjustment of parts accessible from the upper end of the piston.

Pistons and connecting rods of the general class to which the present invention relates are most commonly used in internal combustion engines, although not necessarily restricted to such use, since they may also be employed in thermal motors of other forms, as well as in pumps, air compressors and the like. Accordingly, while for convenience in description and illustration, I may hereinafter make reference to the present invention as embodied in an internal combustion engine, I do not thereby intend to restrict the scope of the invention or to limit its field of use. Moreover, while I shall hereinafter describe certain desirable embodiments of my invention, it is to be understood that the illustration and description of such selected embodiments is by way of example only and that I do not intend to limit the application of the invention by the annexed drawing or description, but only as it is defined in the appended claims.

In the accompanying drawings:

Fig. 1 is a vertical section, partly in elevation, showing one desirable form of my invention and indicating its embodiment in an internal combustion engine;

Fig. 2 is a vertical section on the line 2—2 of Fig. 1;

Fig. 3 is a fragmentary section generally similar to Fig. 1 but illustrating a modified construction;

Fig. 4 is a view generally similar to Fig. 1 but showing modified means for taking up wear between the parts;

Fig. 5 is a vertical section on the line 5—5 of Fig. 4;

Fig. 6 is a fragmentary elevation, partly broken away, showing a modified arrangement in which the end portion of the connecting rod is offset;

Fig. 7 is a vertical section on line 7—7 of Fig. 6;

Fig. 8 is a section substantially on the line 8—8 of Fig. 7, and

Fig. 9 is a view generally similar to Fig. 7 but showing modified means for adjusting the parts.

Referring to Figs. 1 and 2 of the drawings I have illustrated one form of my invention as embodied in an internal combustion engine having a cylinder 1 and head 2 (indicated diagrammatically in broken lines), and a crank shaft having a crank 3. The present invention relates specifically to a piston and connecting rod, and as here shown the piston is of the kind commonly known in the trade as a "trunk" piston having the cylindrical skirt or body portion 4 adapted to slide within the cylinder and provided with the usual grooves for the reception of packing rings. The piston also comprises the head 5, and may be made of any desirable material, such for example as cast iron or aluminium. The force exerted by the piston is transmitted to the crank 3 by a connecting rod 6 having a lower head 7 and cap 8 which cooperate to form a journal bearing for the crank 3 in the usual manner.

The piston, as here disclosed, is provided internally with a supporting web or bracket 9 carrying a bearing member 10. While it is desirable to employ a bearing member of disk-like and preferably annular form for the sake of lightness, it is within the scope of the invention to make the bearing member of other shape. This bearing member 10 is provided with a journal opening 11, which is preferably of substantial diameter as compared with the diameter of the piston. Thus, as here illustrated, the journal opening is of a diameter greater than one-half the diameter of the piston. On the other hand, the bearing 10 is of such width, transversely of the piston, as to provide a space S at one side, at least, between the inner surface of the skirt 4 and the adjacent face F of the bearing, adapted to admit the pivot end of the connecting rod between them as hereinafter described. As illustrated, the journal opening 11 is cylindrical, although I contemplate that it may be of tapered form, if desired.

Preferably the more or less disk-shaped bearing 10 is disposed symmetrically with respect to the axis of the piston so that spaces S and S′ of substantially the same width are left at opposite sides of the bearing, the symmetrical arrangement being preferable to preserve balance and to avoid unequal wear of the parts.

As illustrated in Figs. 1 and 2, the annular bearing 10 is provided with a gap or split 12 at one point, the bearing being of slightly resilient material, and at opposite sides of the gap the bearing is furnished with projecting apertured lugs 13 and 14 respectively. A bolt 15, passing through the apertures in these lugs, and if desired having screw threaded engagement with one lug, for example lug 13, provides for adjusting the effective diameter of the journal opening 11 by contracting the split bearing member. If desired, as shown in Fig. 2, the lug 15 may be slotted at one side of its aperture and a locking bolt 16 may be provided for pinching the lug about the bolt 15 to retain the latter in adjusted position.

Preferably that portion of the bearing member 10 which is opposed to the inner surface of the piston head 5 (the upper portion as shown) is provided with one or more oil receiving openings 17 leading through its substance into the journal opening 11. The inner surface of the piston head 5 is provided with one or more oil delivery members 18, each preferably of tapering form and having its apex 19 disposed in the vertical plane of the openings 17. This member 18 may be of conical form or may form a rib extending transversely of the piston head. The apex of this member 18 provides a delivery point for oil splashed up into the piston head and insures the delivery of this oil into the openings 17 for lubricating the wrist pin within the journal opening 11.

The upper end of the connecting rod 6 is provided with a disk-like, circular, and preferably annular part 20 permanently and preferably integrally united to the body of the rod. This part 20 constitutes a pivot member and is of proper diameter to fit within the journal opening 11 to form an articulated joint between the rod and piston. The connecting rod thus constructed has the same general appearance as an ordinary connecting rod except that its upper end, forming the pivot member, may be of somewhat larger diameter than the corresponding end of the usual rod. The outer surface 21 of this pivot member 20 is smoothly finished, as for example by grinding, to provide a proper wear surface for engagement with the wall of the journal opening, it being noted that it is the outer rather than the inner periphery which forms the bearing surface. A passage 22 is provided through the connecting rod 6 for the adjusting bolt 15, and by tightening the bolt 15 the bearing member 10 may be contracted about the pivot member 20 so as to take up any lost motion due to wear.

In assembling the parts (assuming that the piston is in the cylinder), the piston is moved down so that its lower end projects below the cylinder wall, and the upper part of the connecting rod 6 is moved lengthwise into the space S (or S') as indicated in dotted lines in Fig. 2 until the axis of the part 20 is aligned with the axis of the journal opening. The connecting rod is then moved bodily in the direction of the arrow A in Fig. 2 so as to move the pivot member 20 axially into the journal opening 11. The bolt 15 is now introduced through the openings in the lug 14 and in the connecting rod, and is screwed into the threaded aperture in the lug 13, the bolt being adjusted to take up undesired lost motion between the bearing 10 and the pivot member. If, during use, wear develops, it is simply necessary to introduce a tool upwardly through the crank case to engage the bolt 11 and adjust the latter, thus taking up wear and permitting continued use of the original parts. If, for any reason, it becomes necessary to disengage the piston and connecting rod, the piston may be drawn down to a point slightly between the lower end of the cylinder, the bolt 15 is removed, and the connecting rod is then moved sidewise to disengage the pivot member from the piston bearing.

In Fig. 3 I have illustrated a slightly modified construction in which the bearing member 10ª and its supporting web 9ª correspond to the parts 10 and 9 respectively in Fig. 1. Likewise the connecting rod 6ª and the pivot member 20ª correspond to the parts 6 and 20 of Fig. 1. In this instance there is no provision for adjustment of the bearing member 10ª to take up wear, and this simpler form of construction is sufficient under many circumstances, since by reason of the unusually large bearing surfaces provided between the pivot member and the wall of the journal opening in member 10, little wear takes place and only under extraordinary circumstances does it become necessary to replace the connecting rod and its pivot member.

In Figs. 4 and 5 a further modification is illustrated, the piston 4ᵇ with its bearing member 10ᵇ and supporting web 9ᵇ corresponding to the piston 4, bearing 10, and web 9 of Fig. 1. Likewise the connecting rod 6ᵇ with its pivot member 20ᵇ corresponds to similar parts in Fig. 1. In this instance the lugs 13 and 14 of Fig. 1 are omitted, and the pivot member 20ᵇ, which is of annular form, is provided with a slot 23 so that it may be expanded into contact with the wall of the journal opening. For expanding this pivot member, I preferably provide it with lugs or thickened portions 24 and 25 at opposite sides of the gap 23, and provide the opposed surfaces of these lugs with a conical threaded bore adapted to receive the conical screw-threaded end of an adjusting screw 27. This adjusting screw passes through an opening in a split boss 28 projecting from rod 6ᵇ and extends inwardly and obliquely to the conical threaded bore whose axis is correspondingly oblique. The screw 27 has a slot 29 at its lower end whereby it may be turned by means of a screw driver. By turning the screw 27, its conical end wedges between the parts 24 and 25 and tends to force them apart, thus increasing the effective diameter of the pivot member 20ᵇ so as to take up wear between the parts.

In Figs. 6, 7 and 8, the piston comprises the skirt portion 4ᶜ and bearing member 10ᶜ with its supporting web 9ᶜ, and the connecting rod 6ᶜ has the pivot member 20ᶜ. However, in this modified construction, the bearing member 10ᶜ has its gap 12ᶜ disposed at one side rather than at the bottom as in the preceding constructions. Lugs 13ᶜ and 14ᶜ project at opposite sides of this gap from the bearing 10ᶜ, and a bolt 15ᶜ engaging these lugs is adapted to adjust the effective diameter of the bearing 10ᶜ to take up wear. As here shown, this bolt has a head provided with a plurality of recesses 30 (Fig. 8) selectively adapted to engage the conical head of a locking screw 31. In adjusting the bolt 15ᶜ, the screw 31 is first retracted, the bolt 15 is turned to a desired position, and then the screw 31 is tightened and by engagement with one of the recesses 30 holds the bolt 16 securely in adjusted position.

In this instance the connecting rod 6ᶜ is provided with a lateral offset 32 at its upper end which carries the pivot member 20ᶜ. If of annular form, as shown, this pivot member is preferably provided with bosses or ribs 33 extending transversely across its width to reinforce it and furnish an adequate union with the connecting rod.

The arrangement shown in Figs. 6, 7 and 8 may be assembled and taken apart in the same way and with the same ease as the parts disclosed in Figs. 1 and 2, but has one advantage in that the adjusting member 15ᶜ does not interfere with the complete separation of the pivot member from its bearing regardless of the position of the piston within the cylinder.

In Fig. 9 a further modified construction is shown wherein the piston has a skirt 4ᵈ, the head 5ᵈ, and bearing member 10ᵈ, and the connecting rod 6ᵈ has a pivot member 20ᵈ similar to that shown in Figs. 6 and 7. As shown in Fig. 9, the lower end of the adjusting screw 15ᵈ is furnished with a slot 34 for the reception of a screw driver, and its upper end is provided with a similar slot 35. The piston head 5ᵈ has an opening substantially aligned with the screw 15ᵈ and normally closed by means of a plug 36. By removing this plug it is possible to adjust screw 15ᵈ to take up the wear between the pivot member 20ᵈ and the bearing member 10ᵈ from the upper end of the cylinder as well as from the lower end, so that by simply removing the engine head and taking out the plug 36, all wear and lost motion between the connecting rod and the piston may be taken up. Since the removal of the engine head is necessary as a preliminary to valve grinding, the arrangement shown in Fig. 9 makes it possible to take up wear between the connecting rod and piston, whenever the valves are ground, with but little additional labor.

While certain desirable modifications and embodiments of the invention have herein been shown and described by way of example, I wish it to be understood that changes in proportion, size and relative arrangement of parts, as well as the substitution of equivalents for the parts herein disclosed, may be made without departing from the spirit of the invention.

I claim:

1. The combination of a piston with a connecting rod, the piston comprising an integral bearing element spaced from the inner surface of the piston head, said element having a journal opening, and the connecting rod having a pivot member permanently united to it, said connecting rod being capable of assembly with the piston by movement of the pivot member axially into the journal opening in the bearing element.

2. The combination of a piston, having a journal opening whose axis is transverse to that of the piston, comprising a bearing member spaced from the inner surface of the piston head and permanently fixed in position, said bearing member with a connecting rod having an integral part constituting a pivot member adapted to fit and oscillate within the journal opening in bearing member.

3. The combination of a trunk piston, comprising a head, a skirt portion whose edge forms a complete annulus, and an internal bearing spaced from the inner surface of the head and having a cylindrical journal opening, with a connecting rod having an integral cylindrical pivot member adapted to fit within said journal opening.

4. The combination of a trunk piston, having a head and a skirt whose edge, when the piston is in operation, forms a complete annulus, and connecting rod useful in an internal combustion engine having a cylinder, cylinder head, and crank case, said piston and connecting rod having cooperating parts constituting an articulated joint uniting the piston and rod, said cooperating parts being disengageable to permit separation of the piston and rod by relative movement of said cooperating parts transversely of the piston without removing the cylinder head or withdrawing the piston from the cylinder.

5. The combination of a piston having a head and a skirt portion whose edge forms an uninterrupted annulus with a connecting rod, one of said parts having an integral bearing member provided with a journal opening whose axis, when the parts are assembled, is transverse to the axis of the piston, and the other having an integral element constituting a pivot member engageable with said opening, said pivot member being engageable with the journal opening by movement of the pivot member axially of said opening.

6. The combination of a trunk piston, having an integral internal bearing member spaced from the inner surface of the piston head and provided with a journal opening having its axis substantially perpendicular to the axis of the piston, with a connecting rod having a pivot member united thereto, the piston and bearing member being so constructed and arranged as to permit movement of the rod endwise into the piston until the pivot member is aligned with the journal opening and a further bodily movement of the rod at right angles to said first movement such as to cause the pivot member to enter the journal opening.

7. The combination of a piston having a head, a skirt portion whose edge forms a substantially complete annulus, and a bearing spaced from the head and having a journal opening therein with a connecting rod having an integral annulus at one end, said annulus having a finished outer surface and constituting a pivot member adapted to fit within the journal opening of the piston.

8. The combination with a hollow piston provided with a head, a skirt whose edge forms a substantially complete annulus, and an internal annular bearing provided with a journal opening, a connecting rod having an annular pivot member rigidly united thereto, the annular bearing and pivot members being of substantially equal width in an axial direction, the pivot member having an outer finished wear surface, the annular bearing being so spaced from the inner wall of the piston as to permit insertion of the pivot member in the journal opening by movement of the rod transversely of the piston.

9. A trunk piston for use with a connecting rod provided with an integral circular end portion constituting a pivot member, said piston having a head, a skirt portion, and an annular bearing member within the skirt portion, said bearing member being disposed with its axis transverse to that of the piston and symmetrically with respect to the axis of the piston, said bearing member providing a journal opening for the reception of the pivot member, the annular bearing member being resilient and having a gap therein, apertured lugs projecting from the annular bearing at opposite sides of said gap, and a bolt passing through the apertures in the lugs for varying the effective diameter of the bearing.

10. The combination of a piston with a connecting rod, one of said parts having an element provided with a journal opening whose axis, when the parts are assembled, is transverse to the axis of the piston, and the other of said parts having an integral element constituting a pivot member adapted to fit within said journal opening and engageable therewith by axial movement of the pivot member, and means for varying the effective diameter of one at least of said elements whereby to take up wear between the wall of the journal opening and the pivot member.

11. The combination of a piston with a connecting rod, one of said parts having an annulus providing a journal opening and the other of said parts having an integral annulus constituting a pivot member, one of said annuli being split and resilient, and means for varying the effective diameter of said split annulus to take up wear between the journal opening and pivot member.

12. The combination of a piston with a connecting rod, the piston having a split, annular, resilient bearing providing a journal opening whose axis is transverse to the axis of the piston, a connecting rod having an integral portion constituting a pivot member fitting in said journal opening, and means for varying the effective diameter of said annular bearing to take up wear.

13. The combination of a piston with a connecting rod, the piston having a split, annular, resilient bearing providing a journal opening whose axis is transverse to the axis of the piston, a connecting rod having an integral portion constituting a pivot member fitting in said journal opening, a bolt for adjusting the effective diameter of the split annular bearing, and means for retaining the bolt in adjusted position.

14. The combination of a piston with a connecting rod, the piston having a split, annular, resilient bearing providing a journal opening whose axis is transverse to the axis of the piston, a connecting rod having an integral portion constituting a pivot member fitting in said journal opening, a bolt for adjusting the effective diameter of the split annular bearing, said bolt having a head provided with a plurality of recesses, and locking means engageable with a selected recess in said head to retain the bolt in adjusted position.

15. A connecting rod for use with a trunk piston having a skirt whose edge forms a substantially complete annulus and having a bearing member spaced from the inner surface of the piston head and provided with a journal opening, said rod comprising an annular end portion permanently united to the body of the rod, said annular end portion having a finished outer peripheral surface and constituting a pivot member adapted to fit within the journal opening of the piston.

16. A trunk piston for use with a connecting rod provided with an end portion constituting a pivot member, said piston having a head, a skirt portion, and a bearing member beneath the head and within the skirt portion, said bearing member having a journal opening whose axis is transverse to the axis of the piston, said opening being adapted to receive a pivot member on a connecting rod, the bearing member being spaced at one side at least from the inner surface of the piston to permit introduction of the pivot member between said inner surface and the bearing member.

17. A trunk piston for use with a connecting rod provided with an end portion constituting a pivot member, said piston having a head, a skirt portion, a bearing member disposed in the space within the skirt portion of the piston, said bearing having a journal opening for the reception a pivot member, an oil receiving opening leading through the substance of the bearing member into the journal opening, and an oil directing member projecting from the inner surface of the piston head and converging to a point disposed in the vertical plane of said oil receiving opening.

18. The combination of a piston and connecting rod, said piston having a head, a skirt portion, and an annular bearing member disposed within the skirt portion and spaced from the inner surface of the latter, said bearing providing a journal opening whose axis is transverse to that of the piston, the bearing having a plurality of oil receiving openings leading into the journal opening and all disposed in the same vertical plane, a tapering oil directing member projecting downwardly from the inner surface of the piston head, the apex of said member being disposed in the plane defined by the oil receiving openings, and the connecting rod having an annulus constituting a pivot member fitting within the journal opening in said bearing.

Signed by me at Boston, Massachusetts, this 15th day of December, 1928.

ALLAN E. REID.